W. E. BUTLER.
ELECTRICAL DENTAL ENGINE.
APPLICATION FILED MAY 22, 1912.
1,205,156.
Patented Nov. 21, 1916.
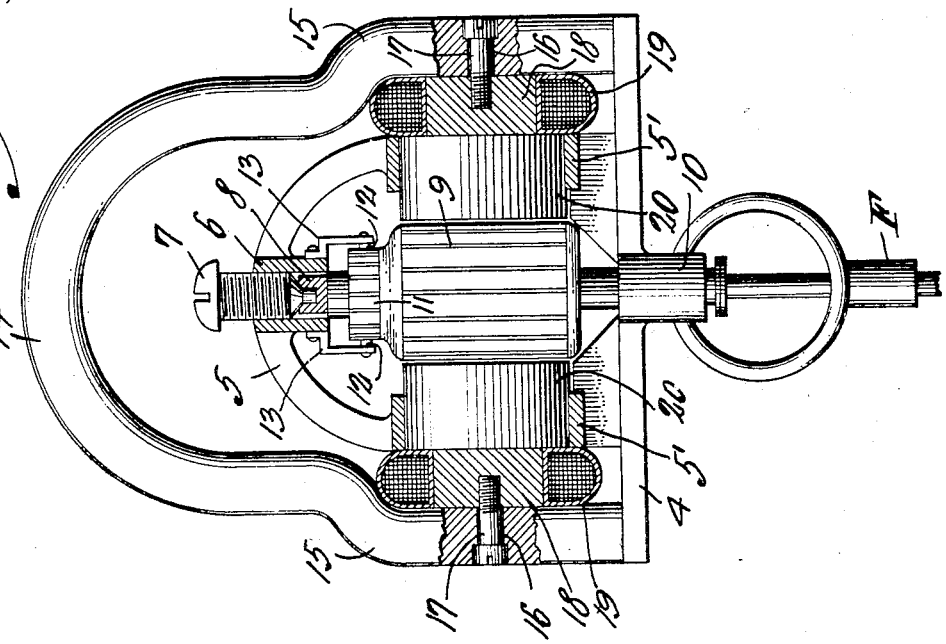
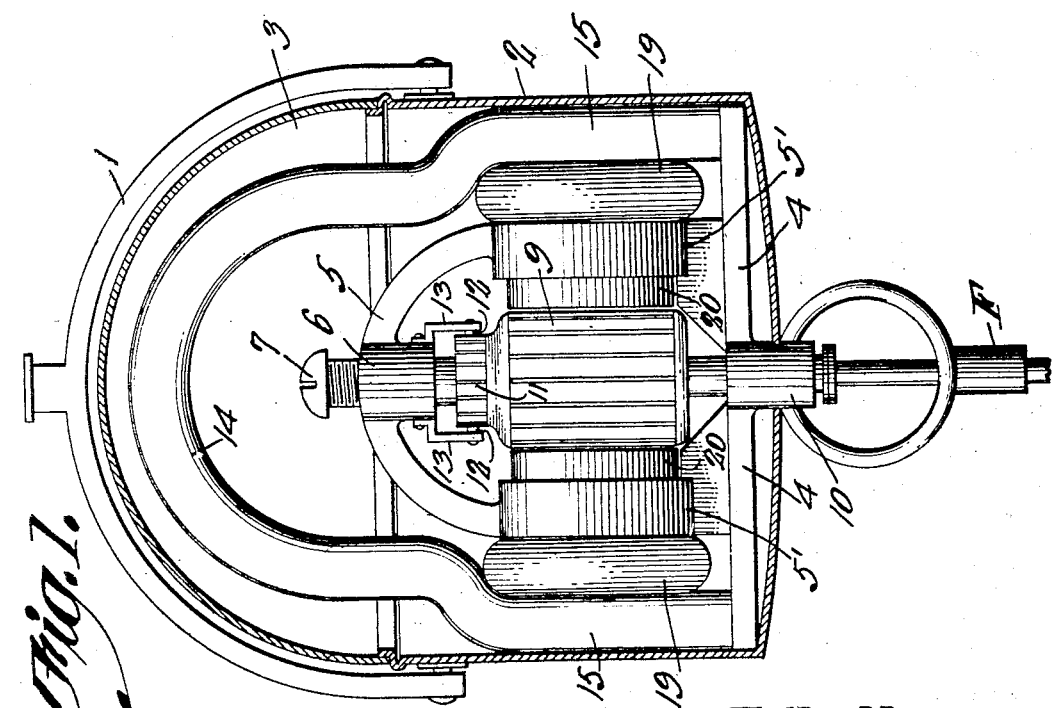
William E. Butler, Inventor
by C. A. Snow & Co., Attorneys
Witnesses

UNITED STATES PATENT OFFICE.

WILLIAM E. BUTLER, OF PERRY, IOWA.

ELECTRICAL DENTAL ENGINE.

1,205,156.   Specification of Letters Patent.   Patented Nov. 21, 1916.

Application filed May 22, 1912. Serial No. 699,055.

*To all whom it may concern:*

Be it known that I, WILLIAM E. BUTLER, a citizen of the United States, residing at Perry, in the county of Dallas and State of Iowa, have invented a new and useful Electrical Dental Engine, of which the following is a specification.

The present invention appertains to electric motors, adapted especially for use as electrical dental engines, and aims to provide an electrical motor of novel and improved construction to render it particularly useful as a permanent magnetic field or electro-magnetic field engine.

It is the object of the invention to provide an electrical motor comprising a unique assemblage of the component parts, to enhance the utility and efficiency thereof.

The invention is illustrated in the accompanying drawing, wherein:

Figure 1 is a side elevation of the motor with its casing illustrated in section. Fig. 2 is an elevation of the motor with parts thereof shown in section.

The motor is confined with a suitable casing 2 suspended by a bail 1, and having a removable cap or cover 3. The motor includes a base plate 4 seated within the casing 2 and having an upstanding yoke or frame 5, and the limbs of the yoke 5 are provided with rings 5' alining with one another. The intermediate upper portion of the yoke 5 has a sleeve 6 into which is threaded an adjustable bearing screw 7.

An upright armature shaft 8 has its upper end journaled in the sleeve 6, the screw 7 providing an upper bearing for the shaft 8, and said shaft 8 carries the armature rotor 9 between the rings 5'. The armature shaft 8 is journaled through a sleeve or bearing 10 with which the base plate 4 is provided between the ends of the yoke 5. A flexible or other shaft F is attached to the lower end of the armature shaft 8 for transmitting the power.

The armature 9 has a commutator 11 adjacent the upper end of the armature shaft, and a pair of brushes 12 coöperate with the commutator 11 and are carried by suitable brackets 13 attached to the sleeve 6. A second and larger yoke 14, providing a permanent magnet, is disposed above the yoke 5 and has the end portions of its limbs offset away from each other at the opposite sides of the limbs of the yoke 5, as indicated at 15. The offset portions 15 have apertures 16 through which screws or securing elements 17 are engaged, the screws 17 threadedly engaging the remote ends of cores 18 which bear against the inner sides of the offset portions 15. Enlarged pole pieces 20 contact with the adjacent ends of the cores 18, between which pole pieces the armature 9 is rotatable. Field coils 19 are disposed upon the cores 18 between the offset portions 15 of the yoke or magnet 14 and the shoulders formed by the enlarged pole pieces 20, so that said coils are held in place. The pole pieces 20 fit in the rings 5'. When the motor is employed without the field coils 19, the field is created by the permanent magnet 14, and when the motor is employed with an electro-magnetic field, the field is established by means of the field coils 19, the electrical connections being made in any well known manner.

The present motor is not a universal one, strictly speaking, since it is not intended to be converted back and forth for alternating and direct current, but is intended more for use in districts using either alternating or direct current, and if the motor is taken from one section to another using different current, it could be adapted for such current without much trouble. When alternating current is used, a demagnetized yoke is employed, as is necessary, and when direct current is used, a permanent magnet is employed. This can be accomplished by either using a new permanent magnet, or by magnetizing the old one which was previously demagnetized by the alternating current.

Particular attention is directed to the assemblage of the parts, it being noted that when the screws 17 are removed, the yoke or magnet 14 can be removed, and this permits the cores 18 to be removed from the rings 5' of the yoke 5. Said rings 5' are carried by the plate 4. The coils 19 may then be removed from the cores 18, and replaced whenever desired. The cores 18 and coils 19 are thus also removable from the remaining parts, in order that they may be substituted or replaced. The combination of the component elements is such that the motor is admirably adapted for use as an electrical dental engine capable of employing either a permanent or electro-magnetic field.

It is evident to those skilled in the art that the present motor can utilize either direct or alternating current, appropriate wire connections being made, which need not be considered in detail. When direct current is used, the field coils can be eliminated, so that the magnetic field is furnished by the magnet 14, the magnetic circuit including said magnet 14, cores 18, pole pieces 20 and the armature. The cores 18 being removable enable the field coils to be readily removed and applied, and the cores 18 can also be replaced. When the field coils are used, they provide the field, since current in flowing through the coils will magnetize the cores 18, which in being disposed between the yoke 14 and pole pieces 20 will complete the magnetic circuit as above indicated. It is therefore of advantage to provide the removable cores 18 which complete the magnetic circuit, and which carry the field coils. When the field coils are not desired, the cores 18 are applied without them, but the cores can be removed at any subsequent time for replacement, or for the application thereto of the field coils.

What is claimed is:

The combination in an electric motor, of a base, a yoke carried thereby and having opposite rings, a magnetic yoke larger than the first mentioned yoke supported by said base, pole pieces fitting in said rings, cores detachably secured to the magnetic yoke and in contact with the pole pieces to complete the magnetic circuit between the pole pieces and the magnetic yoke, removable field coils upon said cores between the pole pieces and magnetic yoke, and an armature rotatable between the pole pieces and having a shaft journaled through said base and the intermediate portion of the first mentioned yoke.

In testimony that I claim the foregoing as my own, I have hereto affixed my signature in the presence of two witneses.

WILLIAM E. BUTLER.

Witnesses:
R. HAMBRIGHT,
G. E. REYNOLDS.